United States Patent [19]

Ellis et al.

[11] Patent Number: 4,816,674

[45] Date of Patent: Mar. 28, 1989

[54] DETERMINING A FORMATION POROSITY FROM NEUTRON LOGGING INFORMATION

[75] Inventors: Darwin V. Ellis, Ridgefield, Conn.; Charles Flaum, Houston; Hubert D. Scott, Katy, both of Tex.

[73] Assignee: Schlumberger Technology Corporation, New York, N.Y.

[21] Appl. No.: 67,898

[22] Filed: Jun. 29, 1987

[51] Int. Cl.$^4$ .............................................. G01V 5/10
[52] U.S. Cl. ..................................... 250/266; 250/269
[58] Field of Search ............... 250/262, 264, 265, 266, 250/269

[56] References Cited

U.S. PATENT DOCUMENTS

| | | | |
|---|---|---|---|
| 4,035,639 | 7/1977 | Boutemy et al. | 250/269 |
| 4,384,205 | 5/1983 | Flaum | 250/265 |
| 4,416,151 | 11/1983 | Ullo | 250/269 |
| 4,423,323 | 12/1983 | Ellis et al. | 250/264 |
| 4,524,274 | 6/1985 | Scott | 250/269 |
| 4,577,102 | 3/1986 | Sherman et al. | 250/269 |
| 4,587,423 | 5/1986 | Boyce | 250/269 |

OTHER PUBLICATIONS

Smith, "Neuton Absorption Effects on Dual-Spaced Thermal Neutron Logging Tools,"SPWLA 28th Annual Logging Symp., 1987.

Edmundson et al, "Radioactive Logging Parameters for Common Minerals", SPWLA 20th Annual Logging Symp., Jun. 3-6, 1979.

Gilchrist et al., "Improved Environmental Corrections for Compensated Neutron Logs", SPE 15540, 1986.

Primary Examiner—Carolyn E. Fields
Attorney, Agent, or Firm—David P. Gordon; Clifford L. Tager

[57] ABSTRACT

A method for determining the porosity of a subsurface geological formation traversed by a borehole is provided. The method generally comprises obtaining a means which relates ranges of apparent formation porosity ($\phi_a$) as determined by a neutron-neutron log, formation fluid salinities, formation total capture cross sections ($\Sigma$), formation matrix and fluid constituents, and true formation porosity ($\phi_T$) according to a predetermined equation. The predetermined equation relates the apparent porosity to a function of a modified migration length which is obtained in a semi-empirical manner (i.e. physics modifed by data). The modified migration length includes a slowing down length and a diffusion length, but causes at least the diffusion length to be a function of the slowing down length. The means which relates the apparent porosity to salinity, $\Sigma$, matrix and fluid constituents, and $\phi_T$ solves a forward problem. Thus, the inverse problem of determining true porosity may be solved by obtaining determinations of salinity, formation matrix and fluid constituents, $\Sigma$, and $\phi_a$, and using the relating means to provide the true porosity. The provided method properly and separately accounts for the effects of capture cross section and salinity, and can be used to correct the apparent porosity determination of a neutron-neutron tool, regardless of the formation matrix or formation fluid constituents.

20 Claims, 2 Drawing Sheets

DETERMINING A FORMATION POROSITY FROM NEUTRON LOGGING INFORMATION

BACKGROUND

1. Field of the Invention

This invention relates to well logging methods for determining the porosity of earth formations surrounding a borehole. More particularly, the invention relates to a method for obtaining porosity determinations in a formation of any lithology from a neutron-neutron logging tool, wherein the porosity determinations are substantially free of salinity and capture cross section effects.

2. Description of the Prior Art

Neutron-neutron logging tools having a neutron source and two neutron detectors spaced at different distances from the source are well known in the art. Such tools are particularly arranged to derive a determination of the porosity of a formation (commonly referred to as the "neutron porosity"), and an example of such a tool and the manner of obtaining the neutron porosity are described in U.S. Pat. No. 3,483,376 issued to S. Locke et al. on Dec. 9, 1969.

In the neutron-neutron tool of the art, neutrons from a neutron source (typically chemical) are emitted into the surrounding formation, and the spaced detectors are arranged to count the rate of thermalized neutrons (e.g. neutrons of an energy of 0.025 eV or less) incident their surfaces. The physical mechanism at work which permits a porosity determination to be made from the count rates of the spaced detectors is the basic fact that neutrons of high energy will most quickly lose their energy when colliding with elements having a mass similar to that of the neutron as opposed to colliding with elements having masses substantially different than that of the neutron. Since the element hydrogen (H) is the only element having a mass similar to that of the high energy neutrons, and hydrogen is found to be a substantial component of hydrocarbons and water (which comprise the porosity of the formation) but not a substantial component of most minerals of the formations, neutrons will more quickly lose their energy in more porous formations having a higher hydrogen content. By comparing the rate of thermalized neutrons detected by the far detector as opposed to the near detector, an indication of how quickly the thermalization of the neutrons in the formation (accounting for borehole and other environmental effects) is occurring becomes available, and an apparent porosity determination can be made therefrom.

Because hydrogen is the primary element at work in affecting the transport of emitted neutrons, it will appreciated that the introduction of salt into the fluid in the formation pores causes the apparent porosity to change as the salt affects the amount of hydrogen in the pores. Moreover, as will be discussed hereinafter, salt affects the porosity determination by introducing chlorine which changes the capture cross section of the formation liquid. The effects of salt on porosity have been studied (although not by distinguishing between the effects of hydrogen displacement and changed capture cross section), and corrections for the same may be had by reference to e.g. Gilchrist, Jr., W. A., et al. SPE 15540 (1986).

It will be appreciated that hydrogen is not the only element at work in affecting the transport of the emitted neutrons. Indeed, it has become readily apparent that different formations having the same porosities but containing different minerals will provide different detector count ratios. Thus, different charts (as may be seen by reference to Schlumberger Log Interpretation Charts, Schlumberger Well Services, 1986) have been made available for three common minerals (dolomite, limestone, and sandstone) so that the porosity can be determined as a function of count rate ratio and mineral.

As aforementioned, another mechanism at work in the formation under investigation which affects the ratio of the thermalized neutron count rates and hence the apparent porosity reading of a neutron-neutron tool is the macroscopic capture cross section (SIGMA $\Sigma$) of the formation. The capture cross section is an indication of how well the formation elements capture neutrons and thus preent the detectors from receiving and detecting thermalized neutrons. In other words, the higher the capture cross section, the fewer the number of neutrons will be available to be counted. While it has been recognized that the capture cross section will affect the count rates of the near and far detectors in different manners thereby affecting the porosity determinations, the art has not provided a comprehensive manner in dealing with the same. Rather, the manner in which the count rates are so affected have been studied for the three aforementioned common minerals filled with freshwater, and charts relating the migration length of the neutrons ($L_m$) (i.e. the root mean square distance the neutron travels until it is captured) with the count ratios and porosity have been provided in helping to determine the true porosity of the formation. (See e.g. H. Edmundson, et al., "Radioactive Logging Parameters or Common Minerals" *SPWLA 20th Ann. Logging Symposium,* June 3-6, 1979.

While the salinity, lithology, and capture cross section effects on the porosity readings of the neutron-neutron tool have been studied, it will be appreciated that in formations having lithologies which do not directly correspond to pure limestone, sandstone, and dolomite, a corrected determination of porosity is not readily available. Also, where the water in the pores of the formation has a capture cross section which is not a function of salinity only, a corrected determination of porosity is not readily available.

SUMMARY OF THE INVENTION

It is therefore an object of the invention to provide a corrected porosity determination for a neutron-neutron tool which can be made in formations of any lithology.

It is another object of the invention to provide with a neutron-neutron logging tool a corrected porosity determination which accounts for lithology, capture cross section, and salinity.

It is a further object of the invention to provide a means which relates ranges of formation porosities, formation fluid constituents, formation matrix constituents, formation total capture cross sections, and apparent formation porosities determined by a neutron-neutron logging tool, according to a predetermined relationship.

It is yet a further object of the invention to use the means which relates the ranges of formation porosities, formation fluid constituents, formation matrix constituents, formation total capture cross sections, and apparent porosities as determined by a neutron-neutron logging tool, together with determinations of the apparent porosity, formation fluid constituents, formation total capture cross section, and formation matrix constituents so that a corrected porosity may be determined for the formation.

In accord with the objects of the invention, a method for determining the porosity of a subsurface geological formation traversed by a borehole generally comprises:

(a) determining an apparent porosity of said formation from measurements obtained with a neutron logging tool having a neutron source and first and second detectors;

(b) determining the total capture cross section, the formation fluid constituents and fluid salinity, and the formation matrix constituents of said formation;

(c) providing a means which relates range of apparent formation porosities ($\phi_a$) for said neutron logging tool, formation porosities ($\phi_T$), formation fluid constituents and fluid salinities, formation tool capture cross sections ($\Sigma$), and at least one set of formation matrix constituents, substantially according to the relationship $$\phi_a = HI^*(10^{[\log(L_m'/C1)]/C2} - C3)$$

where the log is to the base ten, HI* is the effective hydrogen index of the formation fluid which is a function of the salinity of the formation fluid, C1 through C3 are formation matrix-dependent constants, and $L_{m'}$ is defined according to $$L_{m'} = (L_s^2 + f(L_s)L_d^2)^{\frac{1}{2}}$$

where $L_s$ is the slowing down length of the neutrons irradiated by said source in a formation of at least given porosity and formation matrix and fluid constituents, where $L_d$ is the diffusion length of the neutrons irradiated by said source in a formation of given porosity, matrix and fluid constituents, and total capture cross section, where $f(L_s)$ is a porosity dependent weighting factor for the diffusion effect on the total neutron transport; and (d) from said apparent porosity, said total capture cross section, said fluid and matrix constituents of said formation, said fluid salinity, and said means of step c, obtaining a corrected porosity determination for said formation.

Preferably, the means which relates formation porosity, apparent porosity, total capture cross section, salinity, and formation matrix and fluid constituents either comprises a set of look-up tables or charts. The look-up tables or charts are preferably derived from the above-provided relationship. The constants in the relationship are preferably derived in an empirical fashion from known data.

The values for $L_s$ are preferably derived for a range of porosities and matrix and fluid constituents, and if desired may also take salinity and total capture cross section into account. Values for $L_d$ are preferably derived for a range of porosities, matrix and fluid constituents, salinity, and total capture cross section.

Other objects, features, and advantages of the invention will become apparent to those skilled in the art upon reference to the following detailed description of the invention and the accompanying drawings.

DETAILED DESCRIPTION OF THE PREFERRED EMBODIMENT

Figure 1:
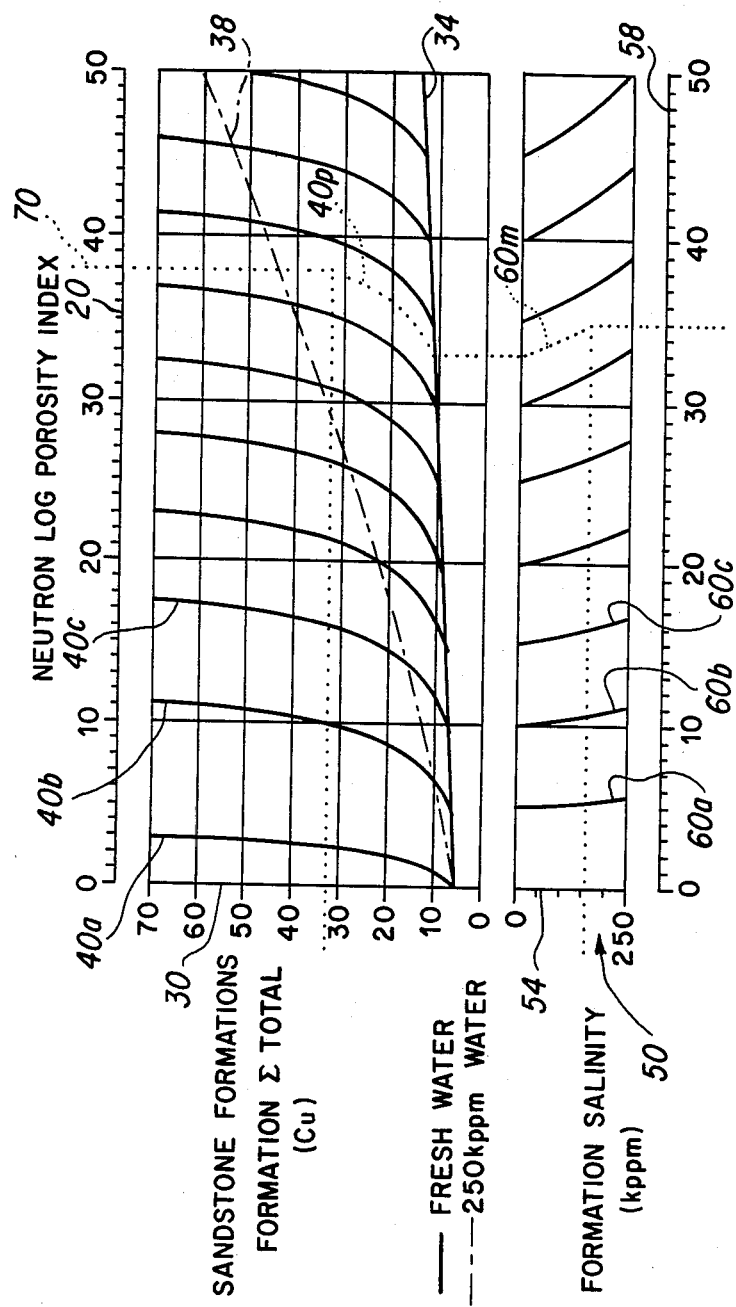
FIG. 1 is a set of graphs relating the apparent porosity as determined from a neutron-neutron tool, particular formation matrix and fluid constituents, total capture cross section, salinity, and corrected porosity.

Before turning to the Figures, a disussion of the theoretical underpinning of the invention is in order. Because it is desired to obtain porosity determinations with a neutron-neutron tool having thermal detectors, it is appreciated that the data obtained are the count rates of the near and far detectors of the tool. In order for the neutrons to be counted, they must slow down from the energy of their release to thermal energies, but must not be captured by the formation. The manner in which the neutrons slow down can be seen to be a function of the formation matrix constituents, formation fluid constituents and salinity, porosity, and total capture cross section.

Those skilled in the art will appreciate that the "migration length" $L_m$ has been used to describe the root mean square distance a neutron will travel until thermal capture. The migration length is defined as the quadratic combination of the slowing down length $L_s$ which generally describes the root mean square distance a neutron travels until it reaches epithermal energies, and the diffusion length $L_d$ which generally describes the root means square distance a neutron travels from the time it reaches epithermal energies until it undergoes thermal capture. Thus, $$L_m^2 = L_s^2 + L_d^2 \quad (1)$$

The slowing down length $L_s$ has been well analyzed and may be determined and defined according to well known techniques. Thus, the slowing down length can be said to take the form:

$$L_s = C1(\phi + C2)^{C3} + C4 \quad (2)$$

where constants C1 through C4 are known for the three most common lithologies. The slowing down length appears to provide a very good analysis of the physics of the neutrons which slow down to epithermal energies and is quite accurate even in the presence of salt water and elements having a high capture cross section.

The diffusion length has also been well analyzed and is defined according to $$L_d = (D/\Sigma)^{\frac{1}{2}} \quad (3)$$

where D is the well-known diffusion coefficient which is a function of lithology, porosity and salinity.

While the migration length as previously defined has been adequate for explaining the general physics of the neutron-neutron logging tools of the art, it is generally accepted that it has not provided a manner for obtaining an extremely accurate porosity determination. Indeed, where the pores of the formation include salt water or other neutron absorbers and/or where the formation includes particularly effective neutron absorbers such as boron, porosity determinations made using the migration length of equation (1), have sometimes deviated several porosity units from the true porosity. Thus, a new modified migration length is provided to obtain a corrected porosity determination which accounts for the presence of neutron absorbers in the formation fluid and matrix.

In obtaining a modified migration length, the slowing down length and diffusion length are defined with a salinity-modified porosity. It is noted that hydrogen is displaced in water when salt is introduced. Thus, to obtain the slowing down length at any porosity and any salinity, an effective formation fluid hydrogen index HI* is found substantially according to:

$$HI^* = 1 - 2.949 \times 10^{-4} S - 6.146 \times 10^{-7} S \qquad (4)$$

where S is the salinity in kppm. Thus, the slowing down length which accounts for salinity (by modifying the porosity) may be defined substantially according to:

$$L_s = C1(\phi HI^* + C2)^{C3} + C4 \qquad (5)$$

where C1 through C4 are empirically determined constants. In a similar manner, the diffusion length is obtained. However, because it is determined that the diffusion coefficient D is less sensitive to hydrogen displacement, the appropriate diffusion length is defined as:

$$L_d = [(C1(\phi(1+(1-HI^*)/2)+C2)^{C3}+C4)/\Sigma]^{\frac{1}{2}} \qquad (6)$$

where $\Sigma$ is calculated from the volumetric mixing law involving the capture cross section of the formation matrix $\Sigma_{ma}$ and the capture cross section of the fluid in the pores $\Sigma_{fl}$. Where the fluid in the pores includes only water and salt, the fluid absorption cross section (in capture units) may be defined according to:

$$\Sigma_{fl} = 22.18 + 3.4743S + 0.022825S^2 + 0.000104S^3 \qquad (7)$$

If the fluid in the pores is not only water and salt, the fluid capture cross section can be derived in other manners. Particularly, the matrix and fluid capture cross sections may be determined from a knowledge of the elemental constituents of the matrix and the fluid. Or, the total capture cross section (and the matrix and fluid components) may be determined using logging tools known in the art which measure thermal decay time, or utilize gamma spectroscopy as is disclosed respectively in commonly-owned U.S. Pat. Nos. 4,334,516 to C. W. Johnstone and 4,317,993 to R. C. Hertzog et al.

While a migration length determination using the slowing down and diffusion lengths set forth in equations (5) and (6) does better account for salinity, it was found that it the relationship of equation (1) would still not properly account for both the affects of salinity and total capture cross section on porosity. Thus, a modified migration length is derived from examining data obtained from various boreholes, such that:

$$L_m = (L_s^2 + \alpha L_d^2)^{.5} \qquad (8)$$

where $\alpha$ is taken as a constant. The form of equation (8) suggests that since $L_d$ is more dependent on capture cross section than $L_s$, the capture cross section may be accounted for with salinity/porosity corrected slowing down length and diffusion length values by altering the migration length definition according to empirical information.

With the migration length equation set forth in equation (8), it will be appreciated that the near detector will see a count rate (N) according to the relationship:

$$N = A_1 e^{(-r1/(L_s^2+\alpha1 L_d^2)^{.178})} + C1 \qquad (9)$$

where $r_1$ is the distance between the source and the near detector, and $A_1$ and $C_1$ are constants dependent on the detector efficiencies, neutron source strength, borehole conditions, etc. Likewise, the far detector will see a count rate (F) according to the relationship:

$$F = A_2 e^{(-r_2/(L_s^2+\alpha_2 L_d^2)^{\frac{1}{2}})} + C2 \qquad (10)$$

where $r_2$ is the distance between the source and the near detector, and $A_2$ and $C_2$ are constants dependent on the detector. Different constants $\alpha_1, \alpha_2$ are provided, as it was found that the value of $\alpha$ was considerably smaller in the case of the far detector.

Taking the count rates seen by the near and far detectors as set forth in (9) and (10), the ratio (R) of the two may be provided in a simplified expression according to an expansion:

$$R = C1 e^{[(C2/L_s)(1+C3(L_d/L_s)^2+C4(L_d/L_s)^4]} + C5 \qquad (11)$$

where the five constants C1 through C5 can be obtained from a fit of data to the equation using a non linear least-squares fit program. If desired, the constants C1 through C5 may be taken as constants independent of matrix constituents even though the constants may be seen to vary slightly in conjunction with matrix constituents. With the ratio so provided, it will be appreciated that porosity, salinity (via $L_d$ and $L_s$), total capture cross section (via $L_d$), and matrix and fluid constituents (via $L_d, L_s$, and the constants) are all related in equation (11), as the ratio of the count rates may be converted into a porosity determination according to teachings such as Gilchrist, et al. SPE-15540 (1986).

While the relationship of equation (11) provides a means of accounting for salinity and capture cross section in a porosity determination (which will be more fully described hereinafter) for a modified migration length as set forth in equation (8), it was still noted that the weighting factor $\alpha$ was not a true constant as it had a different value for the near and far detectors. Thus, a further modified migration length is suggested and is set forth as:

$$L_{m'} = (L_s^2 + f(L_s)L_d^2)^{\frac{1}{2}} \qquad (12)$$

where $f(L_s)$ is the porosity dependent weighting factor for the diffusion effect on the total neutron transport. Through empirical analysis on data, it is determined that $f(L_s)$ can be fit to a simple functional form:

$$f(L_s) = a(L_s)^{\frac{1}{2}} - b \qquad (13)$$

where a and b are constants. According to available data, a best fit occurs when coefficient a is approximately equal to 1, while the offset coefficient b is approximatelly equal to 2.5. If desired, constants a and b can be varied depending upon the matrix constituents of the formation, and appropriate matrix constituent-related constants may be derived empirically.

Using equations (12) and (13), it can be determined that the apparent porosity ($\phi_a$) determined from the count rate ratio of the thermal neutron detectors is related to the true porosity, matrix constituents, fluid constituents and salinity, and capture cross section as follows:

$$\phi_a = HI^*(10^{[\log(L_{m'}/C1)]/C2} - C3) \qquad (14)$$

where the log is to the base ten, $L_m$, is defined in equation (12), HI* is the effective hydrogen index of equation (4), and C1 through C3 are constants related to the matrix constituents..

With the relationships (11) or (14), the apparent porosity (or the ratio of the near to far count rates) should be definable for any combination of matrix and fluid constituents, salinity, total capture cross section and porosity, thereby solving a forward problem. Thus, given a true porosity, a salinity, a total capture cross section, and a set of matrix and fluid constituents, the apparent porosity is defined. It is then straight-forward to vary each variable over a desired range to obtain a look-up table which will store all the information. Or if desired, nomographs such as set forth in FIG. 1 may be derived from the same. Thus, in FIG. 1, where a pure sandstone formation which has water and salt only in the pores is set forth, the neutron log porosity index 20 (apparent porosity) for a particular neutron-neutron tool is charted. The y axis of the chart 30 sets forth the total capture cross section of the formation in capture units (cu), with fresh water line 34 and saturated brine line 38 superimposed thereon. Also superimposed on the chart 30 are curves 40a, 40b, 40c ... (an infinity of which could be provided) which are derived from equation (14) and which correct the apparent porosity for the effects of changes in capture cross section due to salinity in the particular sandstone formation. It is of note, that if the sandstone had had a different elemental constituency than what was provided, a different set of curves would be provided.

Chart 50 of FIG. 1 provides a means of correcting porosity determinations already corrected for capture cross section determinations for the effect salinity has on thermalizing neutrons (i.e. the effect of the displacement of hydrogen which is reflected by the effective hydrogen index HI*). Thus, the formation fluid salinity is set forth on the y axis 54 while a corrected porosity is set forth as the x axis 58. Curves 60a, 60b, 60c ... are specific for the provided fluid constituents and provide a means for making the desired correction. It is of note that if the fluid constituents were indicative of oil, the y axis 54 of chart 50 would have to relate the relative hydrogen indexes of oil and pure water. Also, if the fluid was water with no salt at all, chart 50 would not be required.

Using the charts of FIG. 1, the true porosity of a formation can be determined from the apparent porosity determined from the count rate ratio of a neutron-neutron tool (i.e. the "inverse" problem). Thus, if a pure sandstone formation is provided, with a formation capture cross section of 32 cu, and a formation salinity of 160 kppm, a line 70 (dotted) is seen to extend through the apparent porosity (38 pu) determined from the count rate ratio. The line 70 is continued until it intersects the known capture cross section value (32 cu). The intersection of the apparent porosity line and the capture cross section value provides a single point which is unique to a curve 40p which is one of the set of curves 40 (only 40a, 40b ... having been shown). As is indicated in FIG. 1, line 70 thus follows curve 40p until it intersects with the fresh water line 34, at which time a porosity indication corrected for capture cross section only is available. By extending line 70 from the intersection of the curve 40p and the fresh water line 34 to the graph 50 for salinity correction, a salinity correction (for hydrogen displacement) is obtained. Thus, line 70 follows curve 60m until it intersects with the salinity of 160 kppm, at which point the corrected porosity reading may be had. In accord with the provided example having a sandstone formation having an apparent porosity of 38 porosity units, a formation salinity of 160 kppm, and a formation capture cross section of 32 cu, the true or corrected porosity is determiined to be 35 pu, as seen by the intersection of line 70 with the true porosity axis 80.

Figure 2:
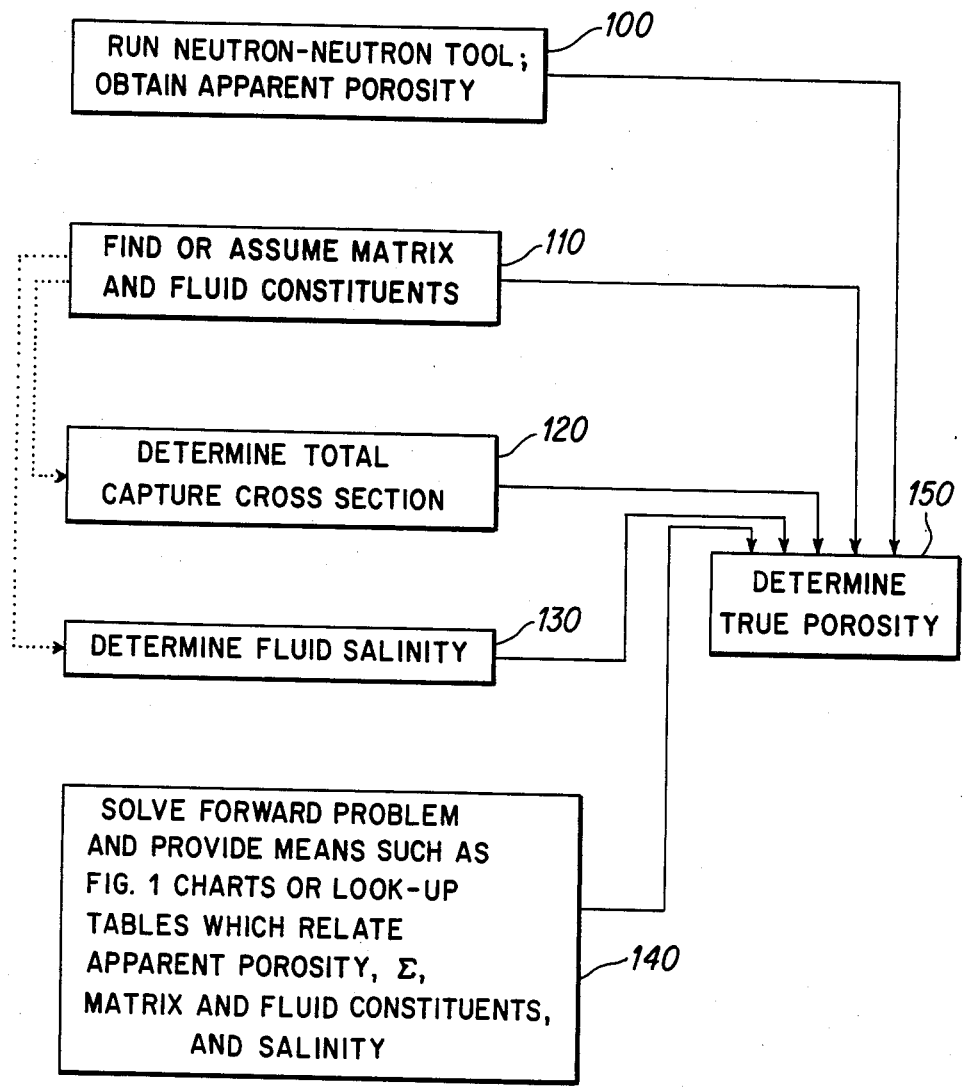
FIG. 2 is a block diagram of the basic steps of carrying out the method invention.

Before turning to FIG. 2, it should be noted that the graphs of FIG. 1 are for a sandstone formation, and that the curve sets 40 and 60 are derived from equation 14. Different curve sets would be provided for a formation having a different set of matrix constituents. However, it should also be noted that instead of providing a different set of charts for each different set of matrix constituents with the capture cross section as the y axis of chart 30, charts for different capture cross sections could be provided with a measure of lithology (e.g. a function of the ratio of slowing down length $L_s$ to the diffusion length $L_d$) as the y axis. In fact, other chart axes, and other arrangements (besides look-up tables or charts) might be suggested to those skilled in the art.

Turning to FIG. 2, a method for determining the porosity of a formation (i.e. the inverse problem) is set forth in block diagram form. At 100, the neutron-neutron apparent porosity of the formation is obtained. Preferably, the manner of obtaining the apparent porosity is to run a neutron-neutron tool having a neutron source (chemical or accelerator) and two spaced thermal detectors in a borehole, and to obtain count rates for the thermal detectors. Using the count rates and other information available, the apparent porosity, free from borehole and other environmental effects may be determined as described in commonly-owned U.S. Pat. No. 3,483,376 issued to S. Locke et al. on Dec. 9, 1969, and U.S. Pat. No. 4,423,323 issued to D. Ellis et al. on Dec. 27, 1983, and in accord with Gilchrist, W. A., Jr., et al. SPE-15540, 1986.

At 110, a determination is made regarding the matrix and fluid constituents of the formation. Preferably, the elemental and/or mineral constituents of the formation are determined according to previous knowledge, a core analysis, or according to techniques and borehole tools such as are disclosed in commonly-owned Ser. No. 574,481 and U.S. Pat. Nos. 4,712,424 and 4,722,220 issued Dec. 12, 1987 and Feb. 2, 1988 respectively to M. Herron.

At 120, the total macroscopic capture cross section ($\Sigma$) of the formation is determined. Preferably, thermal decay time and gamma spectroscopy techniques and tools such as are disclosed in commonly-owned U.S. Pat. No. 4,224,516 issued to C. W. Johnstone on Sept. 23, 1980, and commonly-owned U.S. Pat. No. 4,317,993 issued to R. C. Hertzog, et al. on Mar. 2, 1982 are used to obtain the same. Of course, if desired, core analysis could be utilized to obtain the same. Of, if the fluid and matrix constituents of the formation are known, the total macroscopic capture cross section may be derived therefrom.

At 130, salinity of the liquid in the pores of the formation may be determined from water samples, mud samples, determined spontaneous potentials, or resistivity tools such as are known in the art. Again, if the formation fluid constituents are known, the salinity is easily determined.

At 140, a means for relating apparent porosity, formation matrix and fluid constituents, capture cross section, and true porosity is provided. Preferably, the means for relating the same is a set of look-up tables or charts such as FIG. 1 which were prepared according to the forward problem set forth herein using equation (14). Alternatively, the look-up tables or charts could be prepared in accord with equation (11). Regardless, at 150, the true (corrected) porosity determination is made by providing the apparent porosity, the matrix and fluid constituents, the total capture cross section, and the salinity determined at 100, 110, 120, and 130 respectively, as inputs into the means provided at 140, and determining the true porosity therefrom.

There has been described and illustrated herein methods for obtaining porosity determinations in a formation having any combination of matrix and fluid constituents from a neutron-neutron logging tool, wherein the porosity determinations are free of salinity and capture cross section effects. While particular embodiments of the invention have been described, it is not intended that the invention be limited thereby, as it is intended that the invention be broad in scope and that the specifications be read likwise. Thus, while particular equations for e.g. the hydrogen index and fluid capture cross section, and while a particular simplification of a ratio expressing the count rates of near and far detectors have been set forth, other equations and simplifications may be utilized without deviating from the invention. Also, while the invention calls for a "determination" of matrix and fluid constituents, it will be recognized that the at least some of the constituents, and in particular the fluid constituents, will often be determined by being assumed, as may be the salinity. Likewise, while the invention is described in terms of "determining" the salinity, the matrix and fluid constituents, etc., it will be appreciated that such terminology is intended to include assuming values for the same either through prior knowledge or by arbitrary or educated assumption. Therefore, it will be apparent to those skilled in the art that other changes and modifications may be made to the invention as described in the specification without deparing from the spirit and scope of the invention as so claimed.

We claim:

1. A method for determining the porosity of a subsurface geological formation traversed by a borehole, comprising:
    (a) determining an apparent porosity of said formation from measurements obtained with a neutron logging tool having a neutron source and first and second detectors;
    (b) determining the total capture cross section, the salinity, and the matrix and fluid constituents of said formation;
    (c) providing a means which relates ranges of apparent formation porosities ($\phi_a$) for said neutron logging tool, formation porosities ($\phi_T$), formation fluid salinities (sal), formation total capture cross sections ($\Sigma$), and at least one set of formation matrix and fluid constituents, substantially according to the relationship $$\phi_a = HI^*(10^{[\log(L_{m'}/C1)]/C2} - C3$$

where the log is to the base ten, $HI^*$ is the effective hydrogen index of the formation fluid which is a function of the salinity of the formation fluid, C1 through C3 are constants for each different set of matrix constituents, and $L_{m'}$ is defined according to $$L_{m'} = (L_s^2 + f(L_s)L_d^2)^{\frac{1}{2}}$$

where $L_s$ is the slowing down length of the neutrons irradiated by said source in a formation of at least given porosity and at least formation matrix constituents, where $L_d$ is the diffusion length of the neutrons irradiated by said source in a formation of given porosity, salinity, total capture cross section and at least matrix constituents, and where $f(L_s)$ is a porosity dependent weighting factor for the diffusion effect on the total neutron transport; and
    (d) from said apparent porosity, said total capture cross section, said salinity, said matrix and fluid constituents of said formation, and said means of step c, obtaining a corrected porosity determination for said formation.

2. A method according to claim 1, wherein:
the porosity dependent weighting factor $f(L_s)$ is determined according to $f(L_s) = a(L_s)^c - b$ where a, b and c are constants.

3. A method according to claim 1, wherein:
the porosity dependent weighting factor $f(L_s)$ is determined according to $f(L_s) = a(L_s)^c - b$ where a, b and c are matrix constituent-related constants.

4. A method according to claim 2, wherein:
the diffusion length $L_d$ is determined according to $$L_d = [(C4(\phi(1 + (1 - HI^*)/2) + C5)^{C6} + C7)/\Sigma]^{\frac{1}{2}}$$

where $\Sigma$ is determined according a weighted mixing of the capture cross section of the formation matrix and the capture cross section of the fluid in the pores, and C4, C5, C6 and C7 are constants depending on at least the formation matrix constituents.

5. A method according to claim 3, wherein:
the diffusion length $L_d$ is determined according to $$L_d = [(C4(\phi(1 + (1 - HI^*)/2) + C5)^{C6} + C7)/\Sigma]^{\frac{1}{2}}$$

where $\Sigma$ is determined according to a weighted mixing of the capture cross section of the formation matrix and the capture cross section of the fluid in the pores, and C4, C5, C6 and C7 are constants depending on at least the formation matrix constituents.

6. A method according claim 4, wherein:
the slowing down length is determined according to $$L_s = C8(\phi HI^* + C9)^{C10} + C11$$

where $\phi$ is the porosity of the formation, and C8, C9, C10 and C11 are constants depending on at least the formation matrix constituents.

7. A method according to claim 5, wherein:
the slowing down length is determined according to $$L_s = C8(\phi HI^*_s + C9)^{C10} + C11$$

where $\phi$ is the porosity of the formation, and C8, C9, C10 and C11 are constants depending on at least the formation matrix constituents.

8. A method according to claim 6, wherein:
the hydrogen index of the formation fluid is determined substantially according to $$HI^* = 1 - 2.949 \times 10^{-4} S - 6.146 \times 10^{-7} S$$

where S is the salinity of the fluid in kppm.

9. A method according to claim 7, wherein:
the hydrogen index of the formation fluid is determined substantially according to $$HI^* = 1 - 2.949 \times 10^{-4} S - 6.146 \times 10^{-7} S$$

where S is the salinity of the fluid in kppm.

10. A method according to claim 1, wherein:
said means provided in step c are look-up tables.

11. A method according to claim 1, wherein:
said means provided in step c are charts for each set of different matrix constituents and charts for each set of different fluid constituents, wherein a chart for a first set of matrix constituents relates apparent porosity and total formation capture cross section to a porosity corrected for capture cross section effects including the capture cross section effects of salinity, and wherein a chart for a first set of fluid constituents relates the salinity of the formation fluid and the porosity corrected for capture cross section effects to the true porosity of the formation.

12. A method for determining the porosity of a subsurface geological formation traversed by a borehole comprising the steps of:
(a) obtaining count rates of thermal neutrons which were incident first and second detectors of a neutron logging tool having a neutron source and said first and second detectors which are spaced from said neutron source by distances $r_1$ and $r_2$;
(b) providing a means which relates ranges of formation porosities ($\phi_T$), formation fluid salinities (sal), formation total capture cross sections ($\Sigma$), apparent formation porosities ($\phi_a$) for said neutron logging tool, and at least one set of formation matrix and fluid constituents, substantially according to one of the relationship $$\phi_a = A_1 \frac{e^{(-r_1/(L_s^2 + a_1(L_s)L_d^2))^{\frac{1}{2}}} + B_1}{A_2 e^{(-r_2/(L_s^2 + a_2(L_s)L_d^2))^{\frac{1}{2}}} + B_2}$$

and an approximation thereof,
where $A_1$ and $A_2$ and $B_1$ and $B_2$ are constants,
where $L_s$ is the slowing down length of the neutrons irradiated by said source in a formation of given porosity, fluid salinity, total capture cross section, and at least matrix constituents.
where $L_d$ is the diffusion length of the neutrons irradiated by said source in a formation of given porosity, fluid salinity, total capture cross section and at least matrix constituents, and $a_1(L_s)$ and $a_2(L_s)$ are variables relating to the near and far detectors which variables are a function of the slowing down length $L_s$;
(c) determining an apparent porosity of the formation from the count rates of said first and second detectors;
(d) determining the total capture cross section, the fluid salinity, and the matrix and fluid constituents of said formation; and
(e) from said apparent porosity, said total capture cross section, said salinity, said matrix and fluid constituents of said formation, and said means of step b, obtaining a corrected porosity determination for said formation.

13. A method according to claim 12, wherein:
said approximation of said relationship is determined according to $$R = C_1 e^{[(C_2/L_s)(1 + C_3(L_d/L_s)^2 + C_4(L_d/L_s)^4]} + C_5$$

where the R is the ratio of said count rates, and C1, C2, C3, C4, and C5 are constants for given matrix constituents.

14. A method according to claim 12, wherein:
the diffusion length $L_d$ is determined according to $$L_d = [(C_6(\phi(1 + (1 - HI^*)/2) + C_7)^{C_8} + C_9)/\Sigma]^{\frac{1}{2}}$$

where $\Sigma$ is determined according to a weighted mixing of the capture cross section of the formation matrix and the capture cross section of the fluid in the pores, and C6, C7, C8 and C9 are constants depending on the matrix constituents of the formation, and where HI* is the effective hydrogen index of the formation fluid constituents.

15. A method according to claim 14, wherein:
the slowing down length is determined according to $$L_s = C_{10}(\phi HI^* + C_{11})^{C_{12}} + C_{13}$$

where $\phi$ is the porosity of the formation, and C10, C11, C12 and C13 are constants depending on at least the formation matrix constituents.

16. A method according to claim 12, wherein:
the slowing down length is determined according to $$L_s = C_{10}(\phi HI^* + C_{11})^{C_{12}} + C_{13}$$

where $\phi$ is the porosity of the formation, and C10, C11, C12 and C13 are constants depending on at least the formation matrix constituents, and HI* is the effective hydrogen index of the formation fluid constituents.

17. A method according to claim 15, wherein:
the effective hydrogen index of the formation fluid is determined substantially according to $$HI^* = 1 - 2.949 \times 10^{-4} S - 6.146 \times 10^{-7} S$$

where S is the salinity of the fluid in kppm.

18. A method according to claim 16, wherein:
the effective hydrogen index of the formation fluid is determined substantially according to $$HI^* = 1 - 2.949 \times 10^{-4} S - 6.146 \times 10^{-7} S$$

where S is the salinity of the fluid in kppm.

19. A method according to claim 12, wherein:
said means provided in step b are look-up tables.

20. A method according to claim 12, wherein:
said means provided in step b are charts for each set of different matrix constituents and charts for each set of different fluid constituents, wherein a chart for a first set of matrix constituents relates apparent porosity and total formation capture cross section to a porosity corrected for capture cross section effects including the capture cross section effects of salinity, and wherein a chart for a first set of fluid constituents relates the porosity corrected for capture cross section effects and the salinity of the formation fluid to the true porosity of the formation.

* * * * *